United States Patent [19]

Fuchigami

[11] Patent Number: 4,906,905
[45] Date of Patent: Mar. 6, 1990

[54] DEVICE FOR OSCILLATING A RING MOLD FOR SHEET GLASS

[75] Inventor: Yasuhiro Fuchigami, Osaka, Japan

[73] Assignee: Nippon Sheet Glass Co., Ltd., Osaka, Japan

[21] Appl. No.: 285,863

[22] Filed: Dec. 16, 1988

[30] Foreign Application Priority Data

Dec. 18, 1987 [JP] Japan .......................... 62-192543[U]

[51] Int. Cl.$^4$ ............................................. H02K 7/065
[52] U.S. Cl. ..................................... 318/14; 318/460;
65/348; 65/351
[58] Field of Search ......................... 318/14, 15, 460;
65/162, 163, 164, 273, 348, 349, 351, 374.1

[56] References Cited

U.S. PATENT DOCUMENTS

| | | | |
|---|---|---|---|
| 3,454,388 | 7/1969 | Ritter | 65/348 |
| 3,488,178 | 1/1970 | Welker et al. | 65/351 X |
| 3,600,151 | 8/1971 | Cypher et al. | 65/348 |
| 3,849,100 | 11/1974 | Luppino | 65/351 X |
| 3,905,794 | 9/1975 | Revells et al. | 65/374.1 X |
| 3,994,711 | 11/1976 | McMaster | 65/349 X |

Primary Examiner—Bentsu Ro
Attorney, Agent, or Firm—Lowe, Price, LeBlanc, Becker & Shur

[57] ABSTRACT

An oscillating device for oscillating an object includes a single motor mounted on a base, a support base mounted on the base for supporting an object and movable in first and second orthogonal horizontal directions, a first converter mechanism mounted on the base and coupled to the support base for converting rotation from the motor into a first linear motion in the first horizontal direction and applying the first linear motion in the support base, a second converter mechanism mounted on the base and coupled to the support base for converting rotation from the motor into a second linear motion in the second horizontal direction and applying the second linear motion to the support base, and a clutch mechanism mounted on the base and having two clutch plates with respective engaging surfaces thereof angularly displaced from each other for selectively transmitting the rotation from the motor to the second converter mechanism.

3 Claims, 4 Drawing Sheets

DEVICE FOR OSCILLATING A RING MOLD FOR SHEET GLASS

BACKGROUND OF THE INVENTION

1. Field of the Invention

The present invention relates to an oscillating device for oscillating a ring mold which supports the peripheral edges of a sheet glass in a circular or similar motion within a horizontal plane.

2. Description of the Relevant Art

According to one known method of quenching a sheet glass, the peripheral edges of the sheet glass which is heated to a high temperature are supported, from below, by a ring mold, and oscillatory motion is imparted to the ring mold to move the same in a circular, elliptical, or linear path within a horizontal plane while cooling air is being applied to the surface of the sheet glass.

FIG. 6 of the accompanying drawings shows a conventional oscillating device for imparting such oscillatory motion to a sheet glass. The illustrated oscillating device has a first support plate 102 movably disposed on a base 100 through a slide bearing 101 for movement in the direction of an X-axis (i.e., a horizontal direction in FIG. 6), and a second support plate 104 movably disposed on the first support plate 102 through slide bearings 103 for movement in the direction of a Y-axis (i.e., a direction normal to the sheet of FIG. 6). A ring mold 105 is supported on the second support plate 104. The first support plate 102 is moved in the X-axis direction by a motor 106 through a ball screw 107, and the second support plate 104 is moved in the Y-axis direction by a motor 108 through a ball screw 109.

For example, the ring mold 105 may be oscillated in an elliptical path which, as shown in FIG. 7, starts from an origin o to a to b to c to d to a to o. Between the points o and a, only the motor 106 is energized to move the ring mold 105.

The ring mold supports the peripheral edges of a sheet glass thereon. If the ring mold failed to return to the original position, the supported sheet glass would be displaced out of a desired position. Therefore, the oscillating device is arranged such that it will finally move the ring mold back to the origin o at the end of an oscillating cycle. However, the conventional oscillating device tends to fail to move the ring mold 105 along an exact path and also to return the ring mold 105 back to the origin because of a backlash between the threads of the ball screw 107 and a nut threaded thereover, different weights of the two systems movable along the X- and Y-axes, and a failure to accurately control the timing to start the two motors 106, 108.

Another drawback with the conventional oscillating device is that the ball screw 107 has a short service life since it is rotated about its own axis repeatedly in alternately opposite directions by the motor 106 which is reversible.

SUMMARY OF THE INVENTION

It is an object of the present invention to provide an oscillating device which can move an object exactly along a desired path, develops less backlashes in its mechanisms, and can return the object to an origin after an oscillating cycle.

According to the present invention, there is provided an oscillating device for oscillating an object, comprising a base, a single motor mounted on the base, a support base mounted on the base for supporting an object, the support base being movable in first and second orthogonal horizontal directions, a first converter mechanism mounted on the base and coupled to the support base for converting rotation from the motor into a first linear motion in the first horizontal direction and applying the first linear motion to the support base, a second converter mechanism mounted on the base and coupled to the support base for converting rotation from the motor into a second linear motion in the second horizontal direction and applying the second linear motion to the support base, and a clutch mechanism mounted on the base and having two clutch plates with respective engaging surfaces thereof angularly displaced from each other for selectively transmitting the rotation from the motor to the second converter mechanism.

The rotation of the motor is transmitted via a gearbox to the first converter mechanism, by which the rotation is transmitted as the first linear motion to the support base. After the support base has been moved a certain distance in the first horizontal direction, which may be an X-axis direction, the clutch mechanism is engaged to enable the second converter mechanism to impart the second linear motion to the support base in the second horizontal direction. Therefore, the support base makes a combined two-dimensional motion based on the first and second linear motions.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
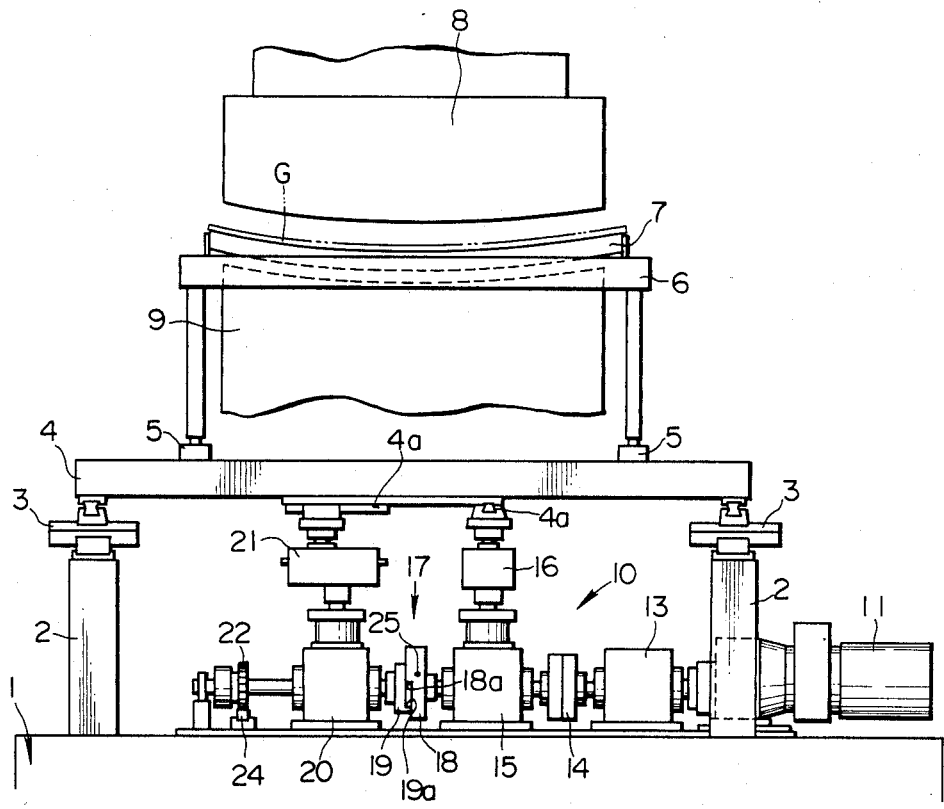
FIG. 1 is a front elevational view of an oscillating device according to the present invention.
Figure 2:
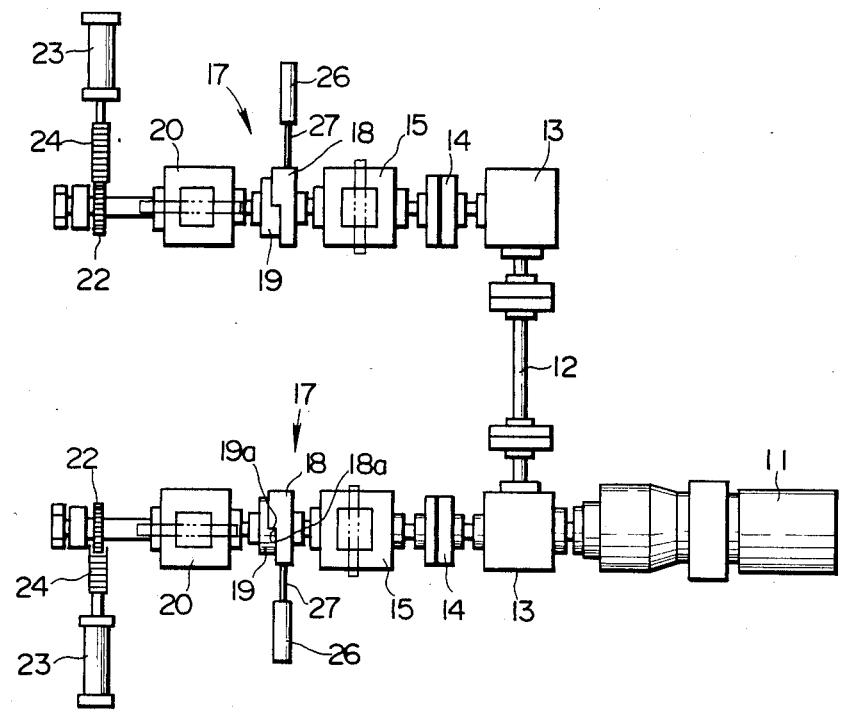
FIG. 2 is a plan view of a power transmitting mechanism of the oscillating device shown in FIG. 1.

As shown in FIGS. 1 and 2, an oscillating device according to the present invention is disposed on a table 1 of a mold changer carriage, for example.

The table 1 supports thereon a plurality of upstanding posts 2. A support base 4 is movably supported on the upper ends of the support posts 2 by means of slide bearings 3 for movement in the direction of an X-axis (i.e., a horizontal direction in FIG. 1) and in the direction of a Y-axis (i.e., a direction normal to the sheet of FIG. 1). A ring mold outer frame 6 is fixedly mounted on the support base 4 by clamp 5, with a ring mold 7 disposed on the ring mold outer frame 6. An upper mold member 8 is positioned above the ring mold 7, and a lower mold member 9 is positioned below the ring mold 7. These mold members 8, 9 are positioned relatively to each other by a suitable positioning member and held on the table 1 without physical interference with other components. Each of the upper and lower mold members 8, 9 is of a hollow structure, and has a plurality of small holes defined in its shaping surface for ejecting cooling air toward a sheet glass G which is supported on the ring mold 7 after the sheet glass G has been shaped.

A power transmitting mechanism 10 is mounted on the table 1. As shown in FIGS. 1 and 2, the power transmitting mechanism 10 includes a pair of gearboxes 13 interconnected by a connecting rod 12. Rotation of a variable-speed motor 11 equipped with a speed reducer is transmitted to the gearboxes 13, from which the rotation is transmitted through couplings 14 to two respective gearboxes 15. The rotation is then transmitted from the gearboxes 15 to first converter mechanisms 16 and respective clutch plates 18 of two clutch mechanisms 17. The clutch mechanisms 17 also include other clutch plates 19 associated respectively with the clutch plates 18 and mounted on one ends of shafts extending from two respective gearboxes 20, through which the rotation from the clutch mechanisms 17 is transmitted to respective second converter mechanisms 21.

Two pinions 22 with one-way clutches are fixed respectively to the other ends of the shafts of the gearboxes 20, and are held in mesh with respective racks 24 which are reciprocally movable by respective cylinder units 23. After the motor 11 has been de-energized, the cylinder units 23 are operated to angularly space engaging surfaces 19a of the clutch plates 19 from engaging surfaces 18a of the clutch plates 18 by 90°. The clutch plates 18 have holes 25 defined in outer circumferential surfaces thereof. The clutch plates 18 can be stopped in constant angular positions by inserting pins 27 moved by respective cylinder units 26 into the respective holes 25.

Figure 4:
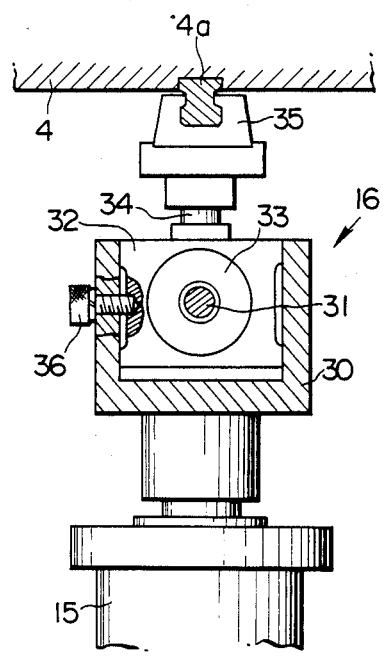
FIG. 4 is a cross-sectional view taken along line IV—IV of FIG. 3.
Figure 5:
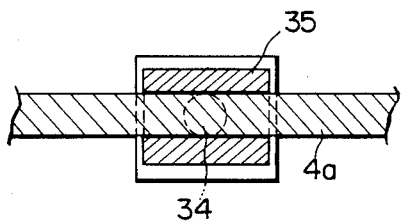
FIG. 5. is a cross-sectional view taken along line V—V of FIG. 3.
Figure 6:
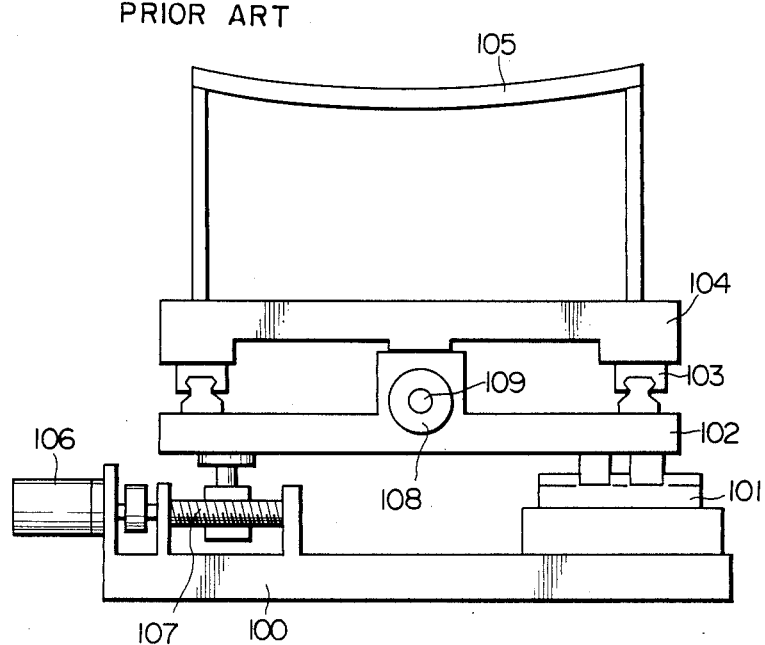
FIG. 6 is a front elevational view of a conventional oscillating device.

The first and second converter mechanisms 16, 21 will be described below. The first and second converter mechanisms 16, 21 are structurally identical to each other, but angularly displaced 90° from each other. Only the first converter mechanisms 16 will be described below with reference to FIGS. 3 through 5.

Each of the first converter mechanisms 16 has an upwardly open elongate box 30 mounted on the upper end of a rotatable shaft 15a projecting upwardly from the gearbox 15. A ball screw 31 is longitudinally disposed in the box 30 and extends through a hole defined in an eccentric block 32. The ball screw 31 is threaded through a nut 33 fixed to the eccentric block 32. By manually rotating the ball screw 31 about its own axis, the eccentric block 32 can be moved over the ball screw 31 along longitudinal inner surfaces of the box 30.

An upstanding pin 34 is mounted on an upper surface of the eccentric block 32. A bifurcated slide 35 is fitted over an upper portion of the pin 34 and slidably engages a rail 4a attached to a lower surface of the support base 4. The eccentric block 32 is fixed to the box 30 by means of a screw 36 threaded through a side wall of the box 30 into the eccentric block 32.

Figure 3:
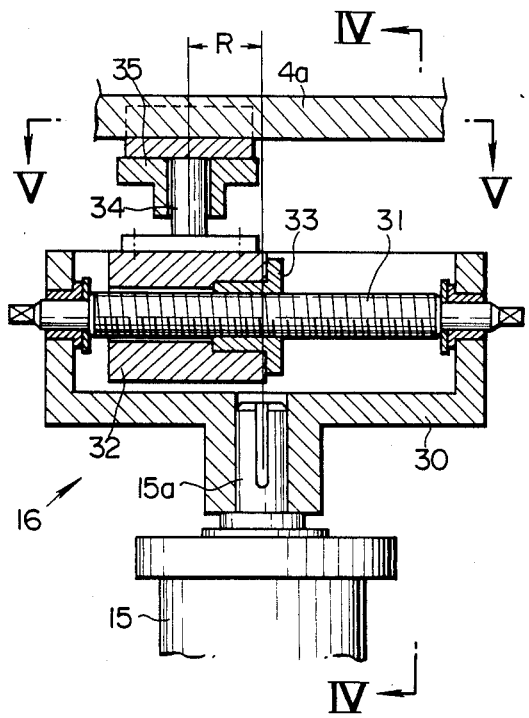
FIG. 3 is a vertical cross-sectional view of a conversion mechanism of the oscillating device.

When the box 30 is rotated with the shaft 15a of the gearbox 15, the pin 34 is rotated within a horizontal plane along a circular path having a radius which is equal to the distance R by which the pin 34 is spaced from the shaft 15a, as shown in FIG. 3. In each first converter mechanism 16, only a component in the X-axis direction (normal to the sheet of FIG. 3) of the circular motion of the pin 34 in the horizontal plane is transmitted through the rail 4a to the support base 4, since the slide 35 is slidable along the rail 4a in the Y-axis direction (i.e., a horizontal direction in FIG. 3). In each second converter mechanism 21, only a component in the Y-axis direction of the circular motion of the pin 34 is transmitted through the rail 4a to the support base 4. The support base 4 therefore makes a composite motion based on the linear motions transmitted from the respective first and second converter mechanisms 16, 21. As a result, the ring mold 7 supported on the support base 4 is reciprocally moved along a circular, elliptical, or linear path.

Figure 7:
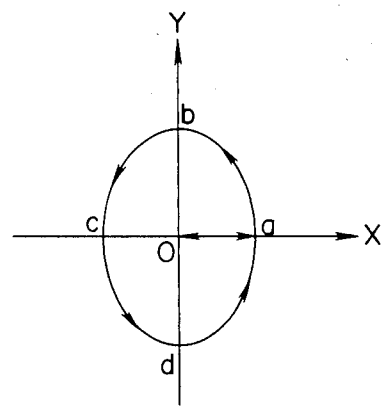
FIG. 7 is a diagram showing a path of movement of a ring mold oscillated by the conventional oscillating device of FIG. 6.

One example of a reciprocating motion imparted to the ring mold 7 by the oscillating device will be described with reference to FIG. 7.

When the ring mold 7 has received a sheet glass G, the engaging surfaces 18a, 19a of the clutch plates 18, 19 of each of the clutch mechanisms 17 are 90° spaced from each other.

Then, the motor 11 is energized to move the ring mold 7 only along the X-axis from an origin o to a point a through the gearboxes 13, 15 and the first converter mechanisms 16. During this time, the ring mold 7 does not move in the Y-axis direction. Thereafter, when the clutch plates 18 are turned 90°, the clutch plates 18, 19 engage each other to transmit the rotation of the motor 11 also to the second converter mechanisms 21. The ring mold 7 is then caused to move in the Y-axis direction, so that the ring mold 7 repeats a composite circular motion based on the motions in the X- and Y-axis directions. Subsequently, the motor 11 is de-energized, and the cylinder units 26 are actuated to insert the pins 27 into the respective holes 25 in the clutch plates 18. At this time, the ring mold 7 is positioned at a point d. Then, the cylinder units 23 are actuated to operate the racks 24 and the pinions 22 to angularly return the clutch plates 19 by 90° so as to be angularly spaced 90° from the clutch plates 18. This movement of the clutch plates 19 returns the ring mold 7 from the point d to the origin o in readiness for a next oscillating cycle.

While the ring mold 7 for supporting the entire peripheral edges of the sheet glass G is supported on the oscillating device in the illustrated embodiment, any of various members or objects which support a portion of a sheet glass may be oscillated by the oscillating device of the present invention.

The support base 4 and hence the ring mold 7 thereon are moved in a combined motion in two horizontal directions, i.e., two-dimensionally, by the single motor 11. Therefore, the ring mold 7 can follow a more accurate path than would be possible if a plurality of motors were employed to move the ring mold. Since the motor 11 is rotated in one direction only, no substantial backlashes will be developed quickly in the various mechanisms of the oscillating device. Moreover, the ring mold 7 can accurately be moved back to its origin by the angularly displaceable clutch mechanisms 18, 19.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. An oscillating device for oscillating an object, comprising:
   a base;
   a single motor mounted on said base;
   a support base mounted on said base for supporting an object, said support base being movable in first and second orthogonal horizontal directions;
   a first converter mechanism mounted on said base and coupled to said support base for converting rotation from said motor into a first linear motion in said first horizontal direction and applying said first linear motion to said support base;
   a second converter mechanism mounted on said base and coupled to said support base for converting rotation from said motor into a second linear motion in said second horizontal direction and applying said second linear motion to said support base; and
   a clutch mechanism mounted on said base and having two clutch plates with respective engaging surfaces thereof angularly displaced from each other for selectively transmitting the rotation from said motor to said second converter mechanism.

2. An oscillating device according to claim 1, wherein said motor is rotatable in one direction only.

3. An oscillating device according to claim 1, wherein said engaging surfaces of said clutch plates are angularly displaced from each other substantially by 90°.

* * * * *